(12) United States Patent
Awadalla et al.

(10) Patent No.: US 8,705,982 B2
(45) Date of Patent: Apr. 22, 2014

(54) SYSTEM AND METHOD FOR REDUCING MEMORY REQUIREMENTS FOR ELECTRICAL DOMAIN COMPENSATION OF INTRA-CHANNEL NONLINEARITY IN AN OPTICAL COMMUNICATIONS SYSTEM

(75) Inventors: Ahmed M. Awadalla, Ottawa (CA); Maurice O'Sullivan, Ottawa (CA)

(73) Assignee: Ciena Corporation, Hanover, MD (US)

( * ) Notice: Subject to any disclaimer, the term of this patent is extended or adjusted under 35 U.S.C. 154(b) by 234 days.

(21) Appl. No.: 13/397,828

(22) Filed: Feb. 16, 2012

(65) Prior Publication Data
US 2012/0148262 A1 Jun. 14, 2012

Related U.S. Application Data

(63) Continuation of application No. 12/337,393, filed on Dec. 17, 2008, now Pat. No. 8,139,954.

(60) Provisional application No. 61/089,949, filed on Aug. 19, 2008.

(51) Int. Cl.
*H04B 10/04* (2011.01)
(52) U.S. Cl.
USPC ............................. 398/193; 398/149; 398/192
(58) Field of Classification Search
USPC .................... 398/147–149, 159, 192–193
See application file for complete search history.

(56) References Cited

U.S. PATENT DOCUMENTS

| | | | | |
|---|---|---|---|---|
| 2006/0023821 A1* | 2/2006 | Barnette et al. | | 375/355 |
| 2006/0078336 A1* | 4/2006 | McNicol et al. | | 398/147 |
| 2008/0049121 A1* | 2/2008 | Tsujimura et al. | | 348/231.99 |
| 2008/0130789 A1* | 6/2008 | Copeland et al. | | 375/297 |
| 2008/0187078 A1* | 8/2008 | Hong et al. | | 375/350 |

* cited by examiner

*Primary Examiner* — Dzung Tran
(74) *Attorney, Agent, or Firm* — Kent Daniels; Daniels IP Services Ltd.

(57) ABSTRACT

A digital filter processes an input signal to be conveyed through an optical communications system. The processing generates a predistorted signal using a compensation function that mitigates impairments of the optical communications system. The input signal has a sample period of T, while the predistorted signal has a sample period of T/2. The digital filter has a first branch including a respective first T-spaced filter for processing the input signal using the compensation function to generate a corresponding first output signal comprising nT/2 samples with n odd. A second branch includes a respective second T-spaced filter for processing the input signal with a delay of T relative to the first branch using the compensation function to generate a corresponding second output signal comprising nT/2 samples with n even. A combiner operates to combine the first and second output signals to generate the predistorted signal having a sample period of T/2.

4 Claims, 10 Drawing Sheets

SYSTEM AND METHOD FOR REDUCING MEMORY REQUIREMENTS FOR ELECTRICAL DOMAIN COMPENSATION OF INTRA-CHANNEL NONLINEARITY IN AN OPTICAL COMMUNICATIONS SYSTEM

CROSS-REFERENCE TO RELATED APPLICATIONS

This application is a CONTINUATION of U.S. patent application Ser. No. 12/337,393, filed Dec. 17, 2008, and allowed Nov. 15, 2011, which claims priority to U.S. Provisional Application No. 61/089,949 filed Aug. 19, 2008. The entire content of both U.S. patent application Ser. No. 12/337,393 and U.S. Provisional Application No. 61/089,949 is hereby incorporated herein by reference.

FIELD OF THE INVENTION

The present disclosure relates generally to optical communications systems, and more particularly to a system and method for reducing memory requirements for electrical domain compensation of intra-channel nonlinearity in an optical communications system.

BACKGROUND

Optical communications systems typically include a pair of network nodes connected by an optical waveguide (i.e., fiber) link. Within each network node, communications signals are converted into electrical signals for signal regeneration and/or routing, and converted into optical signals for transmission through an optical link to another node. The optical link between the network nodes is typically made up of multiple concatenated optical components, including one or more (and possibly 20 or more) optical fiber spans (e.g., of 40-150 km in length) interconnected by optical amplifiers.

The use of concatenated optical components within a link enables improved signal reach (that is, the distance that an optical signal can be conveyed before being reconverted into electrical form for regeneration). Thus, for example, optical signals are progressively attenuated as they propagate through a span, and amplified by an optical amplifier (e.g., an Erbium Doped Fiber Amplifier—EDFA) prior to being launched into the next span. However, signal degradation due to noise and intra-channel nonlinearity such as dispersion effects increase as the signal propagates through the fiber. Consequently, noise and dispersion degradation become significant limiting factors of the maximum possible signal reach.

Dispersion, also known as Group Velocity Dispersion or Chromatic Dispersion, in single mode fibre at least, occurs as a result of two mechanisms: a) Waveguide dispersion: within a single mode fibre, different wavelengths travel along the fibre at different speeds; and b) Material dispersion: the phase velocity of plane waves in glass varies with wavelength.

For the purposes of the present application, references to "dispersion" shall be understood to mean the sum total of group velocity dispersion effects.

Mathematically, first order dispersion can be defined as the derivative of the time delay of the optical path with respect to wavelength. The effect of dispersion can be measured in, for example, picoseconds arrival time spread per nanometer 'line width' per kilometer length (ps nm-1 km-1). The magnitude of waveguide and material dispersions both vary with wavelength, and at some wavelengths the two effects act in opposite senses. The amount of dispersion present in a link can also vary with the temperature of the cable, and if the route is changed (e.g., using optical switches). Dispersion in optical fibre presents serious problems when using light sources whose spectrum is non-ideal, for example broad or multispectral-line, or when high data rates are required (e.g., over 2 GB/s).

For the purposes of analyzing the effects of dispersion, it is convenient to represent an optical communications system using the block diagram of FIG. 1. In this case, the transmitter is represented by an electrical-to-optical converter (E/O) 2 which operates to convert an electrical input signal x(t) into a corresponding optical signal $X_{OPT}(w)$ for transmission to the receiver. The optical fiber span 4, including all concatenated components, is represented by a transfer function H(w), which will normally be complex. The Receiver is represented by an optical-to-electrical converter (O/E) 6 which detects the optical signal $Y_{OPT}(w)$ received through the optical fiber span 4, and generates a corresponding output signal y(t). For a linear optical channel, the received optical signal $Y_{OPT}(w)$ will nominally be equivalent to the product of $X_{OPT}(w)$ and H(w).

In general, the output signal y(t) represents a distorted version of the input data signal x(t). While it would be highly desirable for H(w)≈1, this is rarely the case in prior art systems. Accordingly, it is frequently necessary to utilize at least some form of compensation, so that the original input data signal x(t) can be detected within the distorted output signal y(t).

One commonly used method of addressing the problem of dispersion in high-bandwidth communications systems is by inserting one or more optical dispersion compensators 8, represented in FIG. 1b by the compensation function C(w), within the link Such dispersion compensators may, for example, take the form of length of fibre, a Mach Zehnder interferometer, an optical resonator, or a Bragg reflector. Some of these compensators can also produce a controllable amount of compensation, which enables mitigation of time-variant dispersion effects. In either case, these compensators are intended to at least partially offset the signal distortions introduced by the system transfer function H(w). The compensation function C(w) is a dispersive function that is selected to optimize performance of the link. In a fully linear system, the compensation function C(w) would preferably be equivalent to the complex conjugate H*(w) of the transfer function H(w), in which case H(w)*C(w)=1, and the combined effect of H(w) and C(w)=H*(w) would be an undistorted received signal $Y_{OPT}(w)$ that exactly corresponds to the original optical signal $X_{OPT}(w)$. However, limitations of optical components, and the time-varying amount of compensation required, make this objective very difficult to achieve. Additionally, optical compensators are expensive and introduce significant optical losses. These losses must be offset by means of additional optical gain which introduces more optical noise. The additional (or higher performance) optical amplifiers required to provide this increased gain further increases the total cost of the communications system. In addition, the presence of optical dispersion compensators and high performance amplifiers distributed along the length of the link provides a significant technical barrier to system evolution. For example, implementation of optical switching (e.g., at the Tx and/or Rx ends of the link, or an intermediate site without electrical termination) necessarily requires adjustment of optical amplifiers, in order to accommodate changing energy states within the link.

These problems can be alleviated by moving the compensation function to the terminal ends (e.g., the transmitter 2 and/or receiver 6) of the link. This technique typically involves "preprocessing" the input signal x(t) at the transmitter (Tx) end of the link 4 to improve dispersion tolerance, and/or processing the output signal y(t) detected at the receiver (Rx) end of the link to accurately detect the input signal x(t) within the distorted output signal y(t).

For example, high bandwidth traffic can be distributed over a larger number of lower-rate channels. The reduced bit-rate of each channel enhances the dispersion tolerance in proportion to the square of the reduction in the bit-rate. However, this approach is expensive, spectrally inefficient, and creates wave mixing problems.

Dispersion tolerance can be increased by narrowing the spectrum of the transmitted optical signal. Various known techniques may be used for this purpose, such as multilevel coding. However, this requires expensive electronics and significantly reduces the noise tolerance of the communications system.

Subcarrier multiplexing, which involves transmitting a plurality of lower bit-rate signals over one optical carrier, is another known method of increasing dispersion tolerance. In this case, the dispersion tolerance obtained is equivalent to that of the lower bit-rate subcarrier. However this approach is not cost effective and does not have a good noise tolerance.

It is known that the use of a coherent receiver enables the signal degradation due to dispersion to be removed via linear electrical filtering. However, because of their high cost, very few coherent optical receivers have been installed, and the cost of replacing installed receivers with the high performance coherent receivers is prohibitive.

While modulator non-linearity can be compensated, the output signal y(t) detected at the Rx end of the communications system contains distortion components due to non-linearities in both the modulator (transmitter) 2 and the receiver 6, as well due to optical dispersion within the link 4. These distortions are compounded, one upon the other, and it is difficult to distinguish distortions of the output signal y(t) due to non-linearity of the modulator 2 or the receiver 6. It is also difficult to distinguish these effects from dispersion.

Recently, it has been discovered that optical dispersion imposed on a communications signal conveyed through an optical communications system can be compensated by modulating the communications signal in the electrical domain. A compensation function is determined that mitigates the chromatic dispersion. The communications signal is then modulated in the electrical domain using the compensation function. It has been shown that compensation can be implemented in the transmitter, using a look-up-table and digital-to-analog converter to generate an electrical predistorted signal. The electrical predistorted signal is then used to modulate an optical source to generate a corresponding predistorted optical signal for transmission through the optical communications system. Such a system is described in U.S. Pat. No. 7,382,984, belonging to Nortel Networks Limited.

Some of the approaches that have been suggested to compensate for optical dispersion within an optical link require impractically complex digital signal processing at high link dispersions. Some approaches have proposed a solution based on a nonlinear lookup table built into a digital signal processing (DSP) chip. While this solution is effective at low to moderate chromatic dispersion, a large lookup table populated with values resulting from complex calculations based on many measured link parameters would be required for high levels of chromatic dispersion compensation.

Improved techniques are needed to implement electrical domain compensation in a DSP to compensate for high levels of dispersion (e.g., over long fibre lengths).

SUMMARY

One aspect of the present disclosure provides a digital filter for processing an electrical input signal to be conveyed through an optical communications system. The processing generates a predistorted electrical signal using a compensation function that substantially mitigates for intrachannel non-linearity imparted to the communications signal by the optical communications system. The digital filter includes a Random Access Memory (RAM) having sufficient storage capacity for a reduced data set used for approximating an original, unreduced data set used to implement the compensation function. The reduced data set is used for the digital filter to apply the compensation function to mitigate the intra-channel non-linearity over longer transmission distances of the optical communications system than would be possible without the use of the reduced data set.

Another aspect of the present disclosure provides a system for compensating for intra-channel non-linearity of an optical communications signal conveyed through an optical communications system. The system includes a processor comprising a digital filter and a random access memory, and an optical modulator. The digital filter processes an electrical input signal to generate a predistorted electrical signal using a compensation function that substantially mitigates for intra-channel non-linearity imparted to the communications signal by the optical communications system. The Random Access Memory (RAM) stores a reduced data set used for approximating an original, unreduced data set for implementing the compensation function. The optical modulator converts the predistorted electrical signal into a corresponding predistorted optical signal for transmission through the optical communications system.

Another aspect of the present disclosure provides a method of compensating for intra-channel non-linearity of an optical communications signal conveyed through an optical communications system. The method comprises: determining a compensation function that substantially mitigates the intra-channel non-linearity imparted to the communications signal by the optical communications system; digitally processing an electrical input signal to be conveyed through the optical communications system, using the compensation function, to generate a predistorted electrical signal, the digital processing using a reduced data set stored in a memory for implementing an approximation to the compensation function; and converting the predistorted electrical signal into a corresponding predistorted optical signal for transmission through the optical communications system.

BRIEF DESCRIPTION OF THE DRAWINGS

Reference will now be made to the drawings, which show by way of example embodiments of the present disclosure, and in which.

It will be noted that throughout the appended drawings, like features are identified by like reference numerals.

DETAILED DESCRIPTION

Figure 1A:
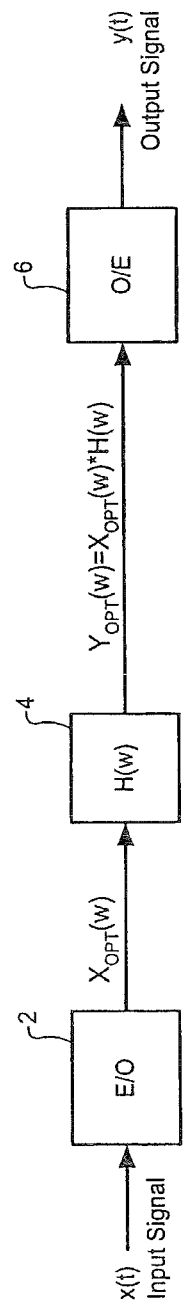
FIGS. 1a and 1b are block diagrams schematically illustrating transmission of an input data signal through a conventional optical communications system.
Figure 1B:
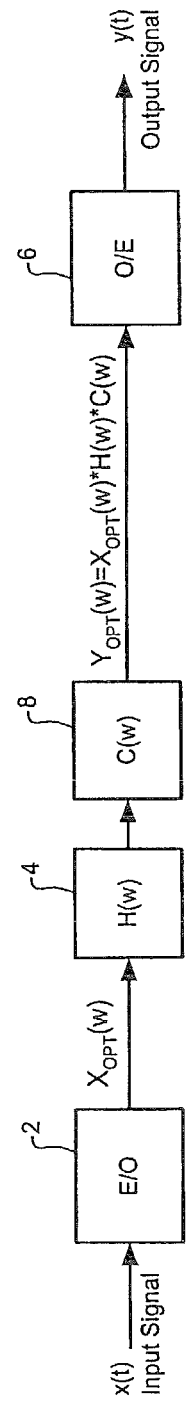
Figure 2A:
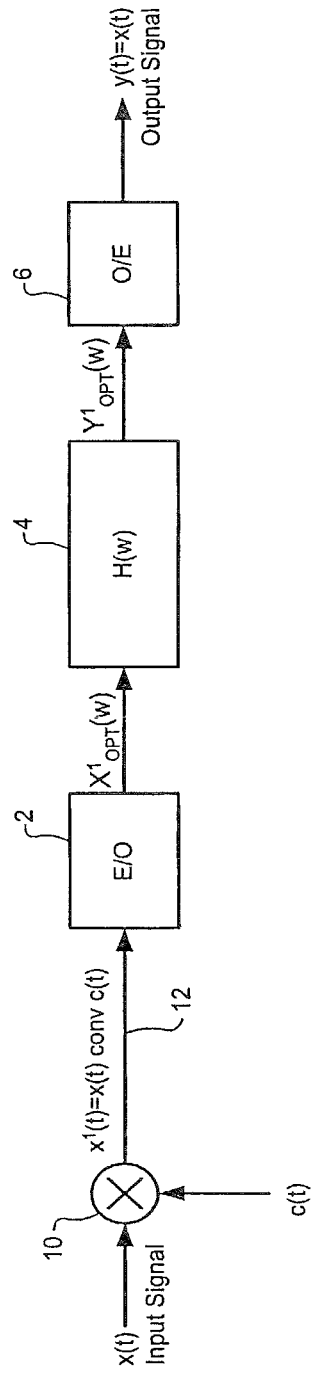
FIGS. 2a and 2b are block diagrams schematically illustrating transmission of an input data signal through an optical communications system where electrical domain compensation of optical dispersion is employed.
Figure 2B:
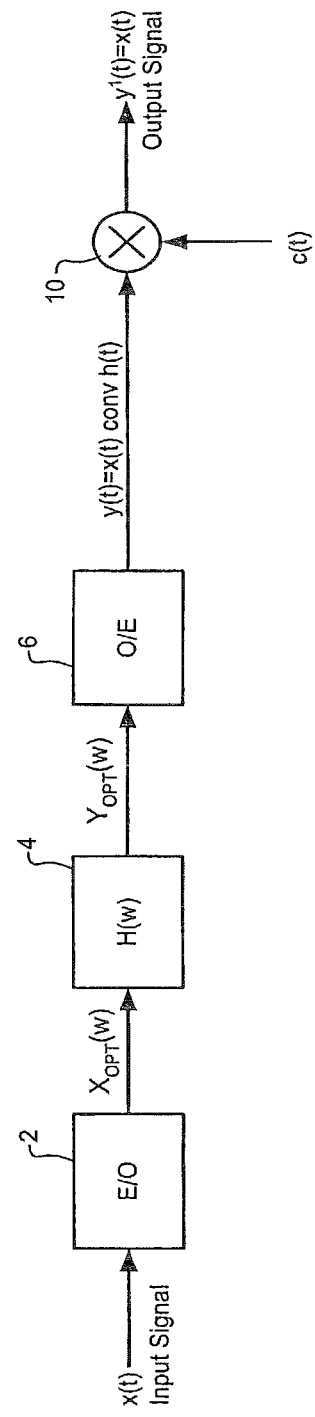

FIGS. 2a and 2b are block diagrams schematically illustrating principal operations of electrical domain compensation of chromatic dispersion in an optical communications system. FIG. 2a shows an embodiment in which dispersion compensation is implemented at the transmitting end of the communications system. FIG. 2b illustrates an embodiment in which dispersion compensation is implemented at the receiving end of the communications system.

As shown in FIG. 2a, an optical communications system is represented by electrical-to-optical (E/O) and optical-to-electrical (O/E) converters 2 and 6 separated by an optical link 4 represented by a system transfer function H(w). In order to simplify the present description, the E/O and O/E converter blocks 2 and 6 shown in FIG. 2 are considered to be ideal, in the sense that they do not introduce any signal distortions that are not otherwise accounted for by the system transfer function H(w). Signal distortions introduced by the system transfer function may be compensated by deriving a compensation function c(t) that optimizes system performance. For chromatic dispersion, for example, the compensation function c(t) will be equivalent to the complex conjugate H*(w) of the system transfer function H(w). In non-linear systems, the compensation function c(t) will be non-linear, but in most cases, the compensation function is selected to optimize system performance. A compensation processor 10 uses the compensation function c(t) to filter the input signal x(t) in the electrical domain, thereby producing a predistorted input signal $x^1\{t\}$ 12 given by: $x^1(t)=x(t)$ cony c(t) where "conv" is the convolution function.

The predistorted input signal x'(t) 12 is then converted to a corresponding predistorted optical signal $x^1_{OPT}(w)$ by the E/O converter 2 and transmitted through the optical link 4 to the receiver. Within the receiver, the incoming optical signal $y^1_{OPT}(w)$ is converted by the O/E converter 6 into a corresponding output signal y(t). As may be seen in FIG. 2, the received optical signal $y^1_{OPT}(w)$ is the predistorted optical signal $x^1_{OPT}(w)$ multiplied by the transfer function H(w) of the optical communications system. Because the distortions introduced by the compensation function c(t) counterbalance those introduced by the system transfer function H(w), the output signal y(t) generated by the O/E converter will be a substantially undistorted version of the original input data signal x(t). Thus the system shown in FIG. 2 provides a technique of compensating optical distortions impressed upon optical signals traversing the optical link 4, by predistorting the input data signal x(t) within the electrical domain at the transmitting end of the optical link 4. Because distortion compensation is accomplished in the electrical domain, a substantially arbitrary compensation function c(t) can be implemented, thereby facilitating effective compensation of even severe optical dispersion.

Figure 3:
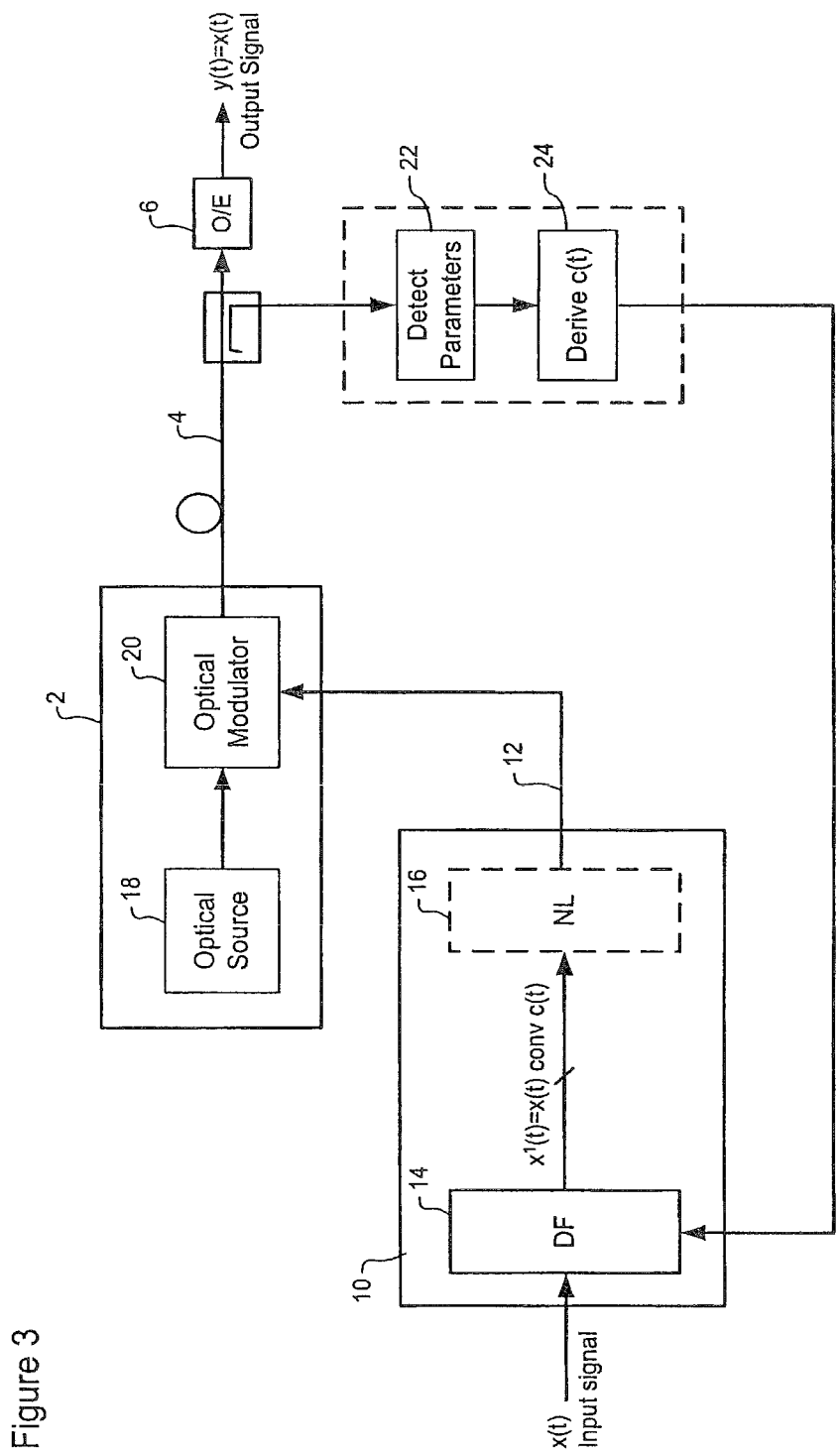
FIG. 3 is a block diagram schematically illustrating principal components and operations of a compensation processor that may be used for electrical domain compensation of optical dispersion in an optical communications system.

FIG. 3 is a block diagram schematically illustrating principal elements and operations of a compensation processor 10. As shown in FIG. 3, the input signal x(t) is filtered by a digital filter 14 which accepts the compensation function c(t) as an input. Various known digital filter types, or to be developed filters, may be used to implement the digital filter 14, such as, for example, Finite Impulse Response (FIR) filters, Infinite Impulse Response (IIR) filters, and Fast Fourier Transform (FFT filters). Alternatively, the digital filter 14 may be implemented using a Random Access Memory Look-up Table (RAM LUT), as will be described in greater detail below. In either case, the digital filter 14 generates the predistorted signal $x^1\{t\}$ 12, which compensates chromatic dispersion due to the system transfer function H(w).

The predistorted electrical signal $x^1\{t\}$ 12 can then be converted into the corresponding predistorted optical signal $x^1_{OPT}\{w\}$ by means of a conventional electrical to optical converter 2. For example, electrical to optical conversion is accomplished using a tuned optical source 18 such as a narrow band laser coupled to a conventional optical modulator 20. In this case, the predistorted signal 12 can be used as an input to control the optical modulator 20 in a manner known in the art.

Various methods may be used to derive the compensation function c(t). In the example of FIG. 3, the optical signal $y^1_{OPT}(w)$ at or near the receiver end of the optical link 4 is monitored (at 22) in order to detect signal quality parameters indicative of dispersion in the optical communications system. The signal quality parameters may comprise a direct measurement of dispersion as a function of wavelength across the wavelength band of interest. However, other signal quality parameters such as, for example, the bit error rate or eye closure may be used a proxies for the dispersion. Any of the signal quality parameters may be detected based on an optical signal obtained by tapping the optical link 4 (as shown by solid lines in FIG. 3), or alternatively by analysis of the output signal y(t) generated by the E/O converter 6 (as shown by the dashed line in FIG. 3). A compensation function c(t) which optimizes the detected parameters can then be derived (at 24) deterministically and/or adaptively, using known techniques, or using other techniques that may be developed in the future. It should be noted that the functional step of deriving the compensation function c(t) can be implemented by any suitable combination of hardware and software, which may be co-located with the receiver, the transmitter, or any other location. Where the detected parameters comprise direct measurement of dispersion, the compensation function c(t) can be calculated to minimize or eliminate the total dispersion. Where bit error rate and/or eye closure are used as proxies, then the compensation function c(t) would be calculated to optimize these respective values.

In the foregoing discussion, the optical modulator 20 was assumed to be fully linear, so that the modulator 20 did not introduce any further distortions beyond those accounted for by the system transfer function H(w). Depending on how the system transfer function H(w) is defined, this approach may yield satisfactory results. However, in many cases it may be desirable to treat the transfer function of the optical fiber span 4 separately from that of the optical modulator 20 and the optical-to-electrical converter 6 in the receiver. In this case, the compensation function c(t) calculated above will not account for distortions introduced by the optical modulator 20 or the optical-to-electrical converter 6. However, the performance of these components is typically well characterized. It is therefore possible to implement a non-linear compensator 16 in order to further distort the predistorted signal 12 in such a manner as to fully compensate nonlinearities of the optical modulator 20 and/or the O/E converter 6, as desired. The non-linear compensator 16 can be implemented as a nonlinear digital filter, such as a look-up table (LUT) or nonlinear multiplier.

Figure 4:
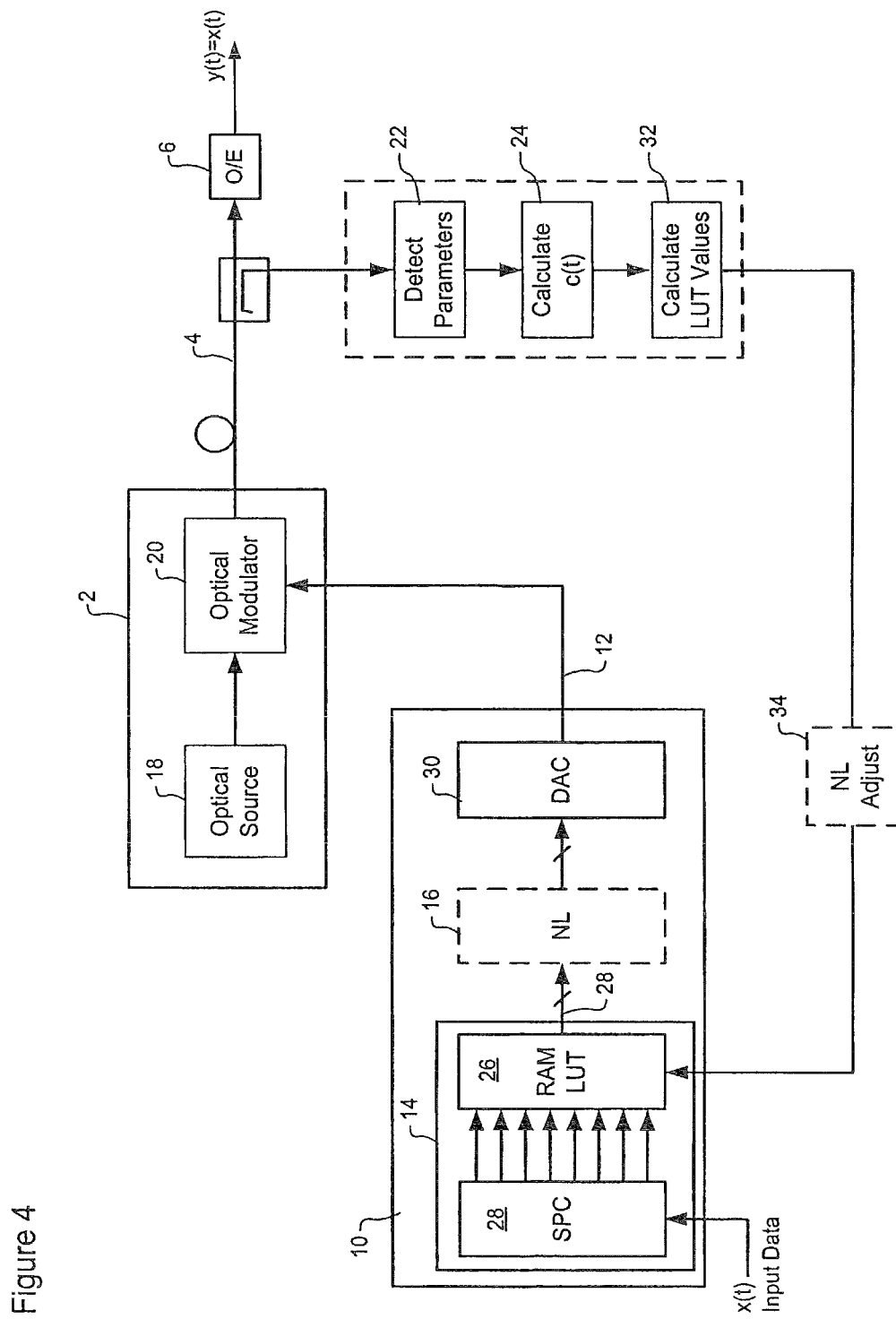
FIG. 4 is a block diagram schematically illustrating principal components and operations of a compensation processor that may be used for electrical domain compensation of optical dispersion in an optical communications system.

As mentioned above, the digital filter 14 may be implemented in a variety of ways. FIG. 4 schematically illustrates the digital filter 14 being implemented using a RAM LUT 26. This technique exploits the fact that the input signal x(t) is a substantially undistorted binary signal, in which successive bits can be unambiguously discriminated. This simplifies the problem of digitally filtering the input signal x(t), because a direct relationship can be defined between the input signal x(t) and the predistorted signal $x^1(t)$ 12.

As shown in FIG. 4, successive bits of the input signal x(t) are latched through a serial-to-parallel converter (SPC) 28 (e.g., a shift register) which converts the serial bit stream into a parallel bit stream having a width of N bits. In the illustrated embodiment N=8, it being understood that other values of N may be used as desired. The parallel data stream is then used to access a random access memory (RAM) look-up table 26 having $2^N$ registers (not shown).

Because the RAM LUT 26 performs a substantially linear filtering function, it is possible to construct the LUT 26 as a set of two or more Random Access Memory blocks (not shown), if desired. In this case, each RAM block stores a respective portion of the desired numerical value of the predistorted signal component. Thus the outputs generated from each RAM block can be summed, in a conventional manner or in any suitable later developed manner, to produce the desired numerical value. This arrangement allows the LUT 26 to be larger than can conveniently be accommodated within a single RAM block.

Each register of the look-up table 16 contains at least one digital number representing the analog value of the predistorted signal $x^1(t)$ 12, which has been previously calculated for a unique set of N bits. Accordingly, as the input serial bit stream is latched through the serial-to-parallel converter 14, a stream of successive digital values 28 of the predistorted signal 12 are output from the look-up table 26. This stream of digital values can then be converted into the corresponding analog predistorted signal $x^1(t)$ 12 using a digital-to-analog converter 30. The analog predistorted signal $x^1(t)$ 12 can then be converted into the corresponding predistorted optical signal $X^1_{OPT}(w)$ by means of a conventional electrical to optical converter 2, as described above.

Various methods may be used to calculate each of the digital values stored in the look-up table 16. In the example of FIG. 4, the optical signal at or near the receiver end of the optical link 4 is monitored (at 22) to detect signal quality parameters and a compensation function c(t) which optimizes the detected parameters derived (at 28), as described above with respect to FIG. 3.

Because chromatic dispersion causes a time domain distortion of an input signal, the instantaneous value of the analog predistorted input signal 12 at a particular instant (t) will necessarily be a function of the analog waveform of the input data signal x(t) within a time window that brackets the instant in question. The width of the time window, measured in symbols, will generally be a function of the maximum dispersion (D) for which compensation is to be provided; the bandwidth (B) of the optical signal; and the symbol interval (S) of the optical signal. For example, consider an optical communications system in which the transmitter generates an optical signal having a bandwidth of B nanometers and a symbol interval of S picoseconds/symbol. In this case, the maximum dispersion (D) that can be compensated is given by the equation:

$$D = N\frac{S}{B}$$

where N is the width of the time window, measured in symbols. It will be appreciated that the selected value of N will limit the maximum dispersion (D) that can be effectively compensated. In general, the value of N will be selected based on the expected maximum dispersion of the optical communications system.

In the example of FIG. 4, the look-up table 26 uses N=8 successive bits of the input signal x(t) to reference successive values of the predistorted signal. In this case, the time window used for calculating each value of the predistorted signal spans a total of N=8 symbols, so that the total dispersion that can be compensated by the system of FIG. 3 will be given by:

$$D = 8\frac{S}{B}$$

Following the discussion above, it will be seen that each value stored in the look-up table 16 can readily be calculated (at 32) by applying the calculated compensation function to each one of the $2^N$ possible N-bit sequences. For each N-bit sequence, the calculated look-up table value may then be stored in the RAM look-up table 16 register that is indexed by the N-bit sequence in question. This process can result in the look-up table 16 being loaded with pre-calculated values of the predistorted signal 12 which will be accessed, in sequence, as successive bits of the input data signal x(t) are latched through the serial-to-parallel converter 14.

In some instances, it may be advantageous to arrange the RAM LUT 26 to output more than one numerical value 28 of the predistorted signal 12 for each symbol of the input signal x(t). This can readily be accomplished by calculating the required numerical values 28 for each N-bit sequence, and storing the resulting set of numerical values in the appropriate register. Consequently, as each bit of the input signal x(t) is latched through the serial-to-parallel converter 28, all of the numerical values calculated for each unique N-bit sequence will be output, in an appropriate sequence, from the RAM LUT 26.

As may be seen in FIG. 4, the non-linear compensator 16 may be implemented as a second look-up table positioned between the dispersion compensation look-up table 26 and the digital-to-analog converter 30. Alternatively, the look-up table values calculated (at 32) using the compensation function c(t) can be adjusted (at 34) based on the known nonlinearities of the optical modulator 20 and/or optical-to-electrical converter 6. In this case, values 28 obtained by accessing the RAM look-up table 26 will combine compensation for both dispersion and nonlinearities.

As shown in FIGS. 3 and 4, a single compensation processor path is provided for generating the predistorted signal $x^1(t)$ 12 based on the input signal x(t). As will be appreciated by those skilled in the relevant arts, such an arrangement is for example suitable for modulating a single dimension (e.g., either amplitude or phase) of the input data stream x(t). Accordingly, the predistorted signal $x^1(t)$ 12 of the embodiments of FIGS. 3 and 4 will comprise an amplitude or phase modulated version of the original input data stream x(t). However, the system transfer function H(w) of the optical communications system will normally be complex, so that an optical signal traversing the communications system will suffer distortions in both phase and amplitude. This issue is addressed by configuration shown in FIG. 5.

Figure 5:
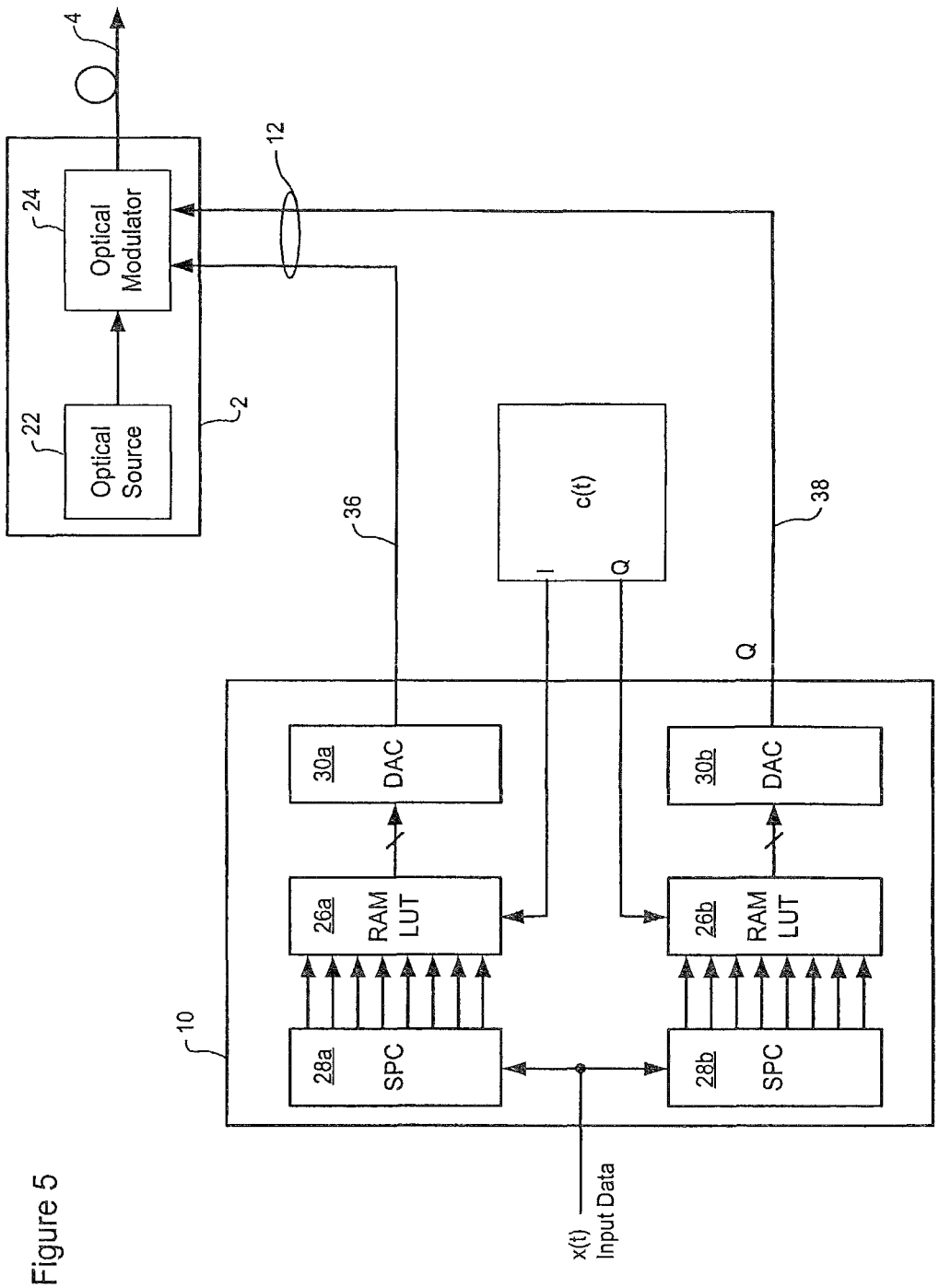
FIG. 5 is a block diagram schematically illustrating principal components and operations of another compensation processor that may be used for electrical domain compensation of optical dispersion in an optical communications system.

FIG. 5 is a block diagram schematically illustrating a multi-dimensional compensation processor 10 used to compensate complex system transfer function effects. In general, the multi-dimensional compensation processor 10 provides an independent compensation path for each dimension of the communications system for which compensation is to be provided. In the embodiment of FIG. 5, it is desired to provide compensation for both amplitude and phase distortions, and therefore the multi-dimensional compensation processor 10 comprises a pair of independent compensation paths. In this case, a pair of compensation paths generate respective output signals I and Q (at 36 and 38) that represent respective orthogonal (Cartesian) components of the predistorted signal 12. The two output signals I and Q are then supplied to a suitable multi-dimensional optical modulator 24 capable of modulating the amplitude and phase of light generated by the optical source 22 in response to the signal components I and Q of the predistorted signal 12. Various optical modulators capable of providing this functionality are known in the art, such as, for example, Mach Zehnder modulators. Suitable optical modulators to be developed in the future may also be used.

Figure 6:
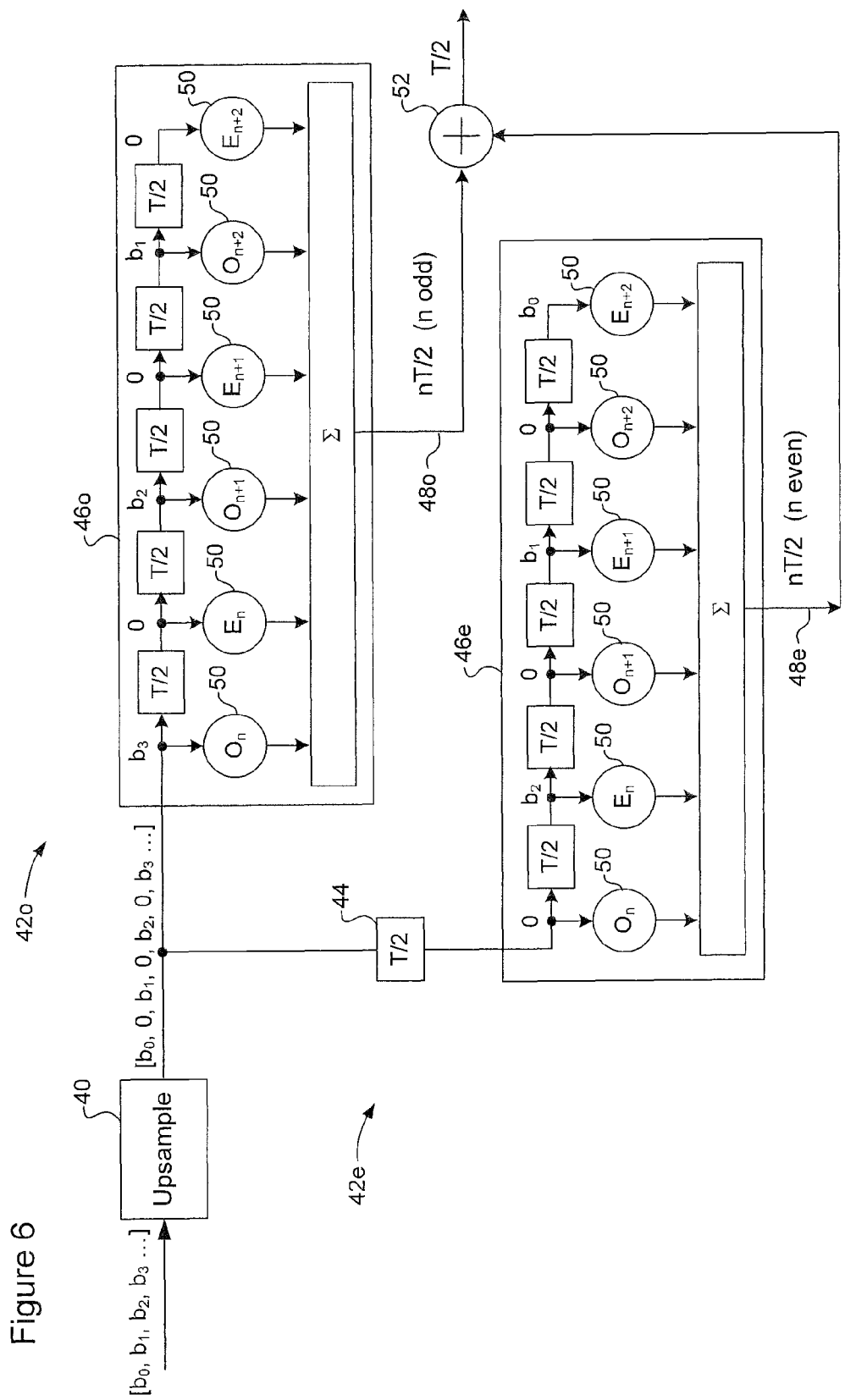
FIG. 6 is a partial block diagram of an Finite Impulse Response (FIR) filter that may be employed in an optical modulator.

As mentioned above, precompensation may be applied through Finite Impulse Response (FIR) filters implemented, for example, in an optical modulator. For example, two dimensional modulation may be employed, which uses two FIR filters. These two FIR filters in operating in the optical modulator may aim to accomplish one or more of the following: (a) Spectral shaping of the input bit sequence; (b) Precompensation of the receiver filter; (c) Dispersion precompensation; and (d) Self-Phase modulation precompensation. The modulator may operate at 2 samples per bit which is the minimum rate satisfying the Nyquist criterion. The binary data signal x(t) has a sample rate of one sample per bit, with each sample having a period of T, and so may be referred to as a "T-spaced signal". Upsampling may be used to convert the T-spaced data signal x(t) into a digital signal having 2 samples per bit (to satisfy the Nyquist criterion), with each sample having a period of T/2. Upsampling can be accomplished by inserting a new sample (having a zero value) between each sample of the original binary data signal x(t), and then filtering using a T/2-spaced FIR filter. Thus, for example, FIG. 6 illustrates an embodiment in which a binary data signal comprising a T-spaced sample stream [$b_1$, $b_2$, $b_3$, . . . ] is upsampled at 40 by adding zero-valued samples to yield a T/2-spaced sample stream [$b_1$, 0, $b_2$, 0, $b_3$, 0, . . . ] which is split into two branches 42o and 42e with a relative T/2 delay 44. Each branch 42 includes a respective T/2-spaced FIR filter 46, and generates a corresponding signal 48. Each filter 42 utilizes a conventional sift register and tap architecture known to those in the art, and applies a respective compensation coefficient 50 to each tap, based on the compensation function. One of the filters 46 may be termed an odd filter as it produces an output signal comprising nT/2 samples with n odd, while the other filter may be termed an even filter as it produces an output signal comprising nT/2 samples with n even. These two output signals 48 are then combined at 52 to yield the desired T/2-spaced predistorted signal which satisfies the Nyquist criterion.

Figure 7:
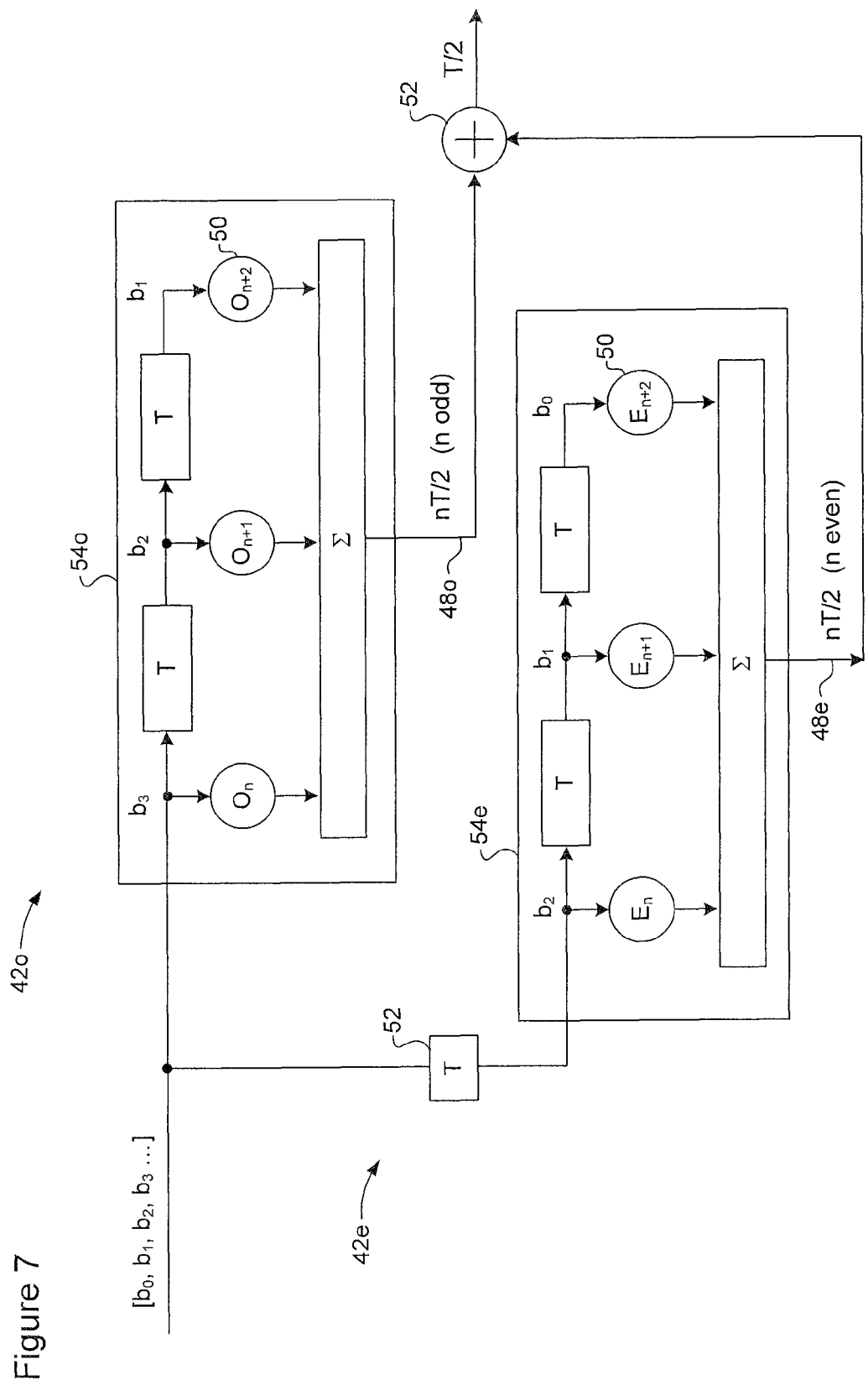
FIG. 7 is a partial block diagram of an alternative Finite Impulse Response (FIR) filter that may be employed in an optical modulator.

FIG. 7 illustrates an alternative embodiment, in which, instead of the upsampler 40 and T/2 spaced FIR filter of FIG. 6, the T-spaced input signal itself is supplied to the two branches with a relative T delay. Each branch contains a respective T-spaced filter 54, which respectively produce output signals comprising nT/2 samples with n odd, and nT/2 samples with n even. These two signals are combined at 50 to yield the desired T/2 spaced predistorted signal. An advantage of the arrangement of FIG. 7 is that it is performs the precompensation and upsampling functions of the embodiment of FIG. 6, but without the upsampler 40 and using half of the taps (and thus approximately half the gates) required in the branch filters 46, which leads to significant cost savings.

Figure 8:
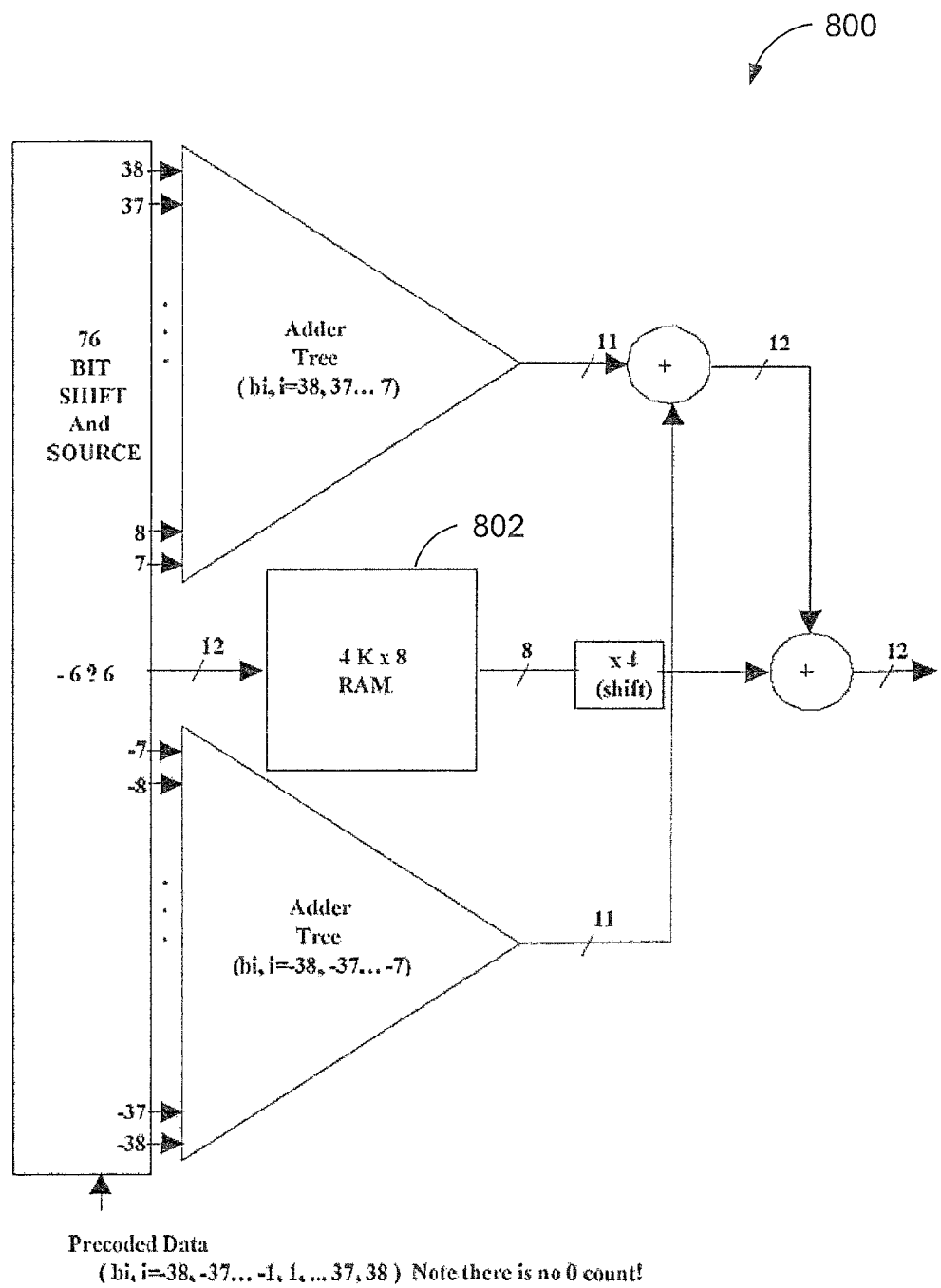
FIG. 8 is a schematic diagram of an exemplary FIR filter that may be employed in an optical modem having an optical modulator performing precompensation.

Referring to FIG. 8, a schematic diagram of an FIR filter 800 is shown that may be employed as a respective branch filter 54 in an optical modem having an optical modulator that performs pre-compensation. This FIR filter 800 has 76 taps, which enables processing of 76 successive samples bi [i=−38, −37 . . . −1, 1, 2, . . . 38] of the input signal. A Random Access Memory (RAM) 802 that enables, for example, self-phase modulation (SPM) compensation, is centered between the filter taps. In the illustrated embodiment, the RAM 802 replaces the center 12 taps, and therefore possesses a memory size of $2^{12}$=4096 Bytes. Without SPM compensation, the RAM cells are populated by a dot product of each address with the taps the RAM replaces, which yields the same action as the taps it replaced.

For long reach SPM compensation in long haul fibres stretching vast distances, larger RAMs, such as the RAM 802, are typically needed in the FIR filter. For example, an 18 bit wide RAM is needed to compensate for a 20 optical fibre span system.

Figure 9:
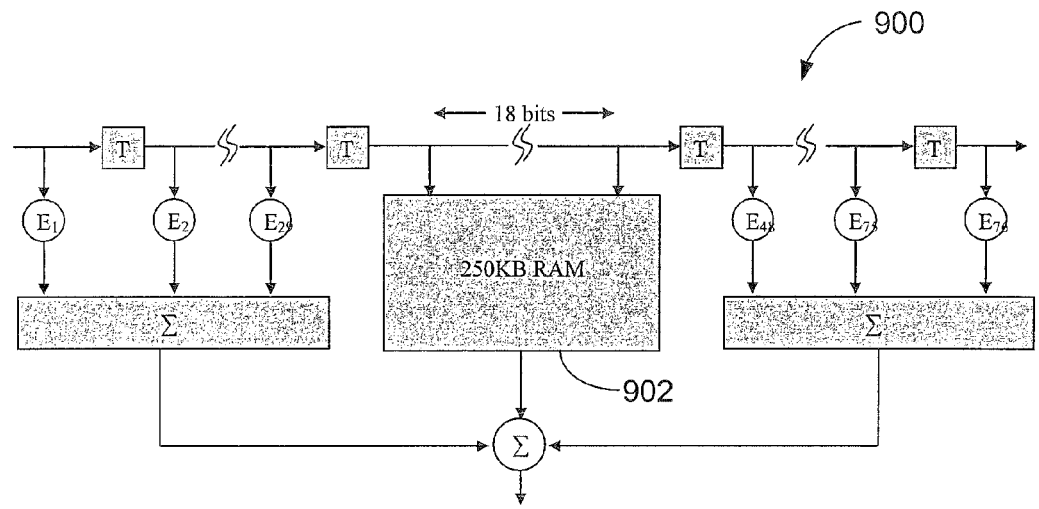
FIG. 9 is a partial block diagram of a Finite Impulse Response (FIR) filter used to implement an 18 bit wide RAM to provide SPM compensation in a long haul optical fibre.

Referring to FIG. 9, an exemplary partial block diagram of a Finite Impulse Response (FIR) filter implementation 900 is shown, where the rest of the 76 entries of the filter 900 are represented by the usual Tap structure known to those skilled in the art of digital signal processing. However, 18 bit wide RAM (i.e., 250 KB) that is needed to implement SPM compensation in the exemplary 20 optical fibre span system presents a challenge, as the optical modulators currently in use in typical optical modems have RAMS of limited size, for example only approximately 2 KB of RAM available, for performing the needed digital signal processing. In accordance with one aspect of the present disclosure, data manipulation techniques may be employed to reduce the size of the RAM needed. In one example, Principal Component Analysis (PCA) may be applied to take advantage of the symmetries of the original data set stored in the RAM 902, such that the effect of using 250 KB of RAM can be approximated using only, in one example, three 512 byte RAM allocations.

Figure 10:
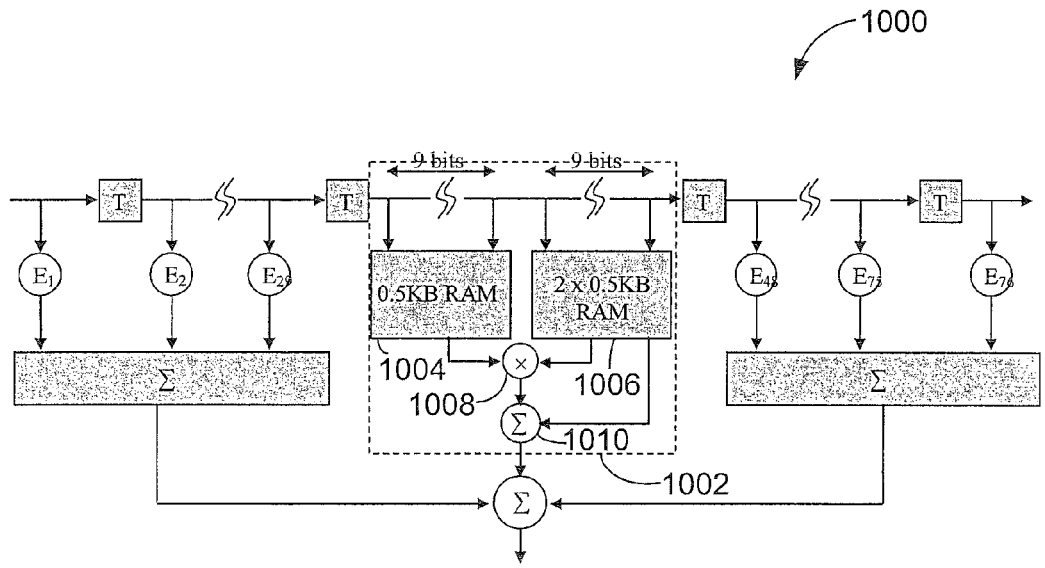
FIG. 10 is a partial block diagram of a Finite Impulse Response (FIR) filter where the 250 KB RAM of FIG. 9 has been replaced with a smaller RAM configuration.

Referring to FIG. 10, an exemplary partial block diagram of a Finite Impulse Response (FIR) filter implementation 1000 is shown, where the 250 KB RAM 902 shown in FIG. 9 has been replaced with the RAM configuration 1002. The RAM configuration 1002 has a first RAM 1004 and a second RAM 1006. In one example, the first RAM 1004 is 0.5 KB in size and is nine bits wide and the second RAM 1006 is comprised of two 0.5 KB RAMs and is also nine bits wide, corresponding to the total eighteen bit width shown for the RAM 902 of FIG. 9. The RAM 1004 has an output providing a signal to a function 1008 and the RAM 1006 has a first output providing a first signal to the function 1008. In one example, the function 1008 may be a dot product, but may be dependent on the type of data manipulation technique applied. The function 1008 has an output that provides a signal to an adder 1010. The RAM 1006 also has a second output that provides a second signal to the adder 1010. The adder 1010 has an output that provides the output for the RAM 1002 and corresponds to the output of the 250 KB RAM 902, shown in FIG. 9. Using data manipulation techniques, described in more detail below, the output of the RAM 1002 approximates the output of the RAM 902, as the content of the lookup table stored in the RAM 1002 is a reduced data set derived from the original data set, stored in the RAM 902.

Assuming the original unreduced data set content of the RAM 902 is represented as a 218 element row vector Y, the content may be modeled in the following manner:

$Y=[X_1 X_2 X_3 \ldots X_{512}]$, where Xn is a 512 element row vector.

Using Principal Component Analysis, three 512 element long vectors X, A and B may be calculated, where:

$$X_1 \approx A(1) \times X + B(1)$$
$$X_2 \approx A(2) \times X + B(2)$$
$$\ldots$$
$$X_{512} \approx A(512) \times X + B(512)$$

Therefore, in one embodiment, Y can be approximated using only the three vectors X, A, and B, instead of 512 element original vectors Xn, where, for example, A is stored in the RAM 1004, X is stored in the RAM 1006, and B is stored in the RAM 1006.

In a second embodiment, two 512 Byte RAMs may be used to replace the 250 KB RAM 902, where:

$$X_1 \approx X + B(1)$$
$$X_2 \approx X + B(2)$$
$$\ldots$$
$$X_{512} \approx X + B(512)$$

In the example above, X may be initially chosen in an empirical fashion and may not yet be optimized, hence resulting in sub-optimum performance. X may be further optimized therefore enhancing performance. The Vector B may be calculated using a least square error fit.

Figure 11:
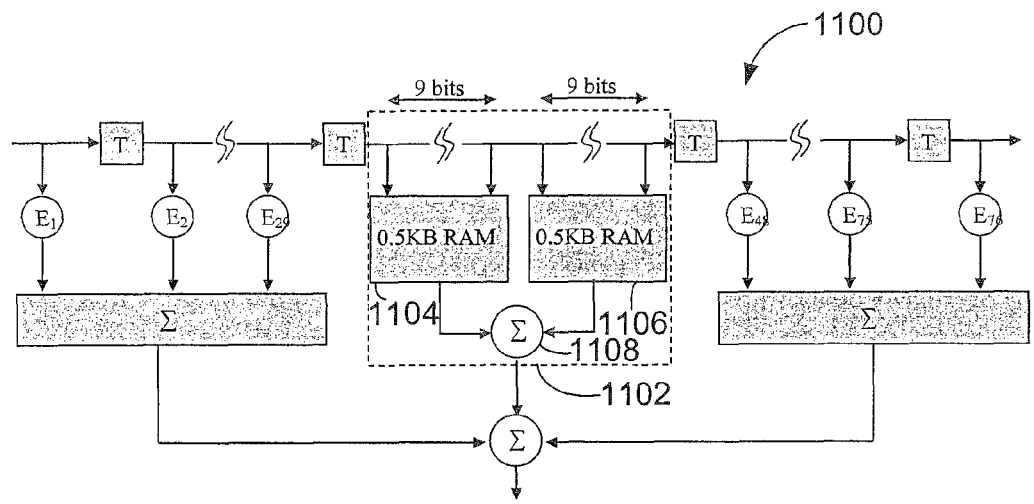
FIG. 11 is a partial block diagram of a Finite Impulse Response (FIR) filter where the 1.5 KB RAM of FIG. 10 has been replaced with a smaller RAM configuration.

Referring to FIG. 11, an exemplary partial block diagram of a Finite Impulse Response (FIR) filter implementation 1100 is shown, where the 3×0.5 KB RAM configuration 1002 shown in FIG. 10 has been replaced with the RAM configuration 1102. The RAM configuration 1102 has a first 0.5 KB RAM 1104 and a second 0.5 KB RAM 1106. The 0.5 KB RAM 1106 replaces the 2×0.5 KB RAM 1006 shown in FIG. 10. The function 1008 is also no longer needed. Therefore, the first 0.5 KB RAM 1104 and the second 0.5 KB RAM 1106 each have an output providing a signal to an adder 1108, which provides an output corresponding to an output of the RAM configuration 1102. In this example, the RAM 1104 may store the vector X while the RAM 1106 may store the vector B. Using the second embodiment described above, the cumulative size of the RAMS 1104 and 1106 needed to implement the compensation function is reduced to approximately 1 KB, or well less than 1% of the size of the original RAM 902.

Figure 12:
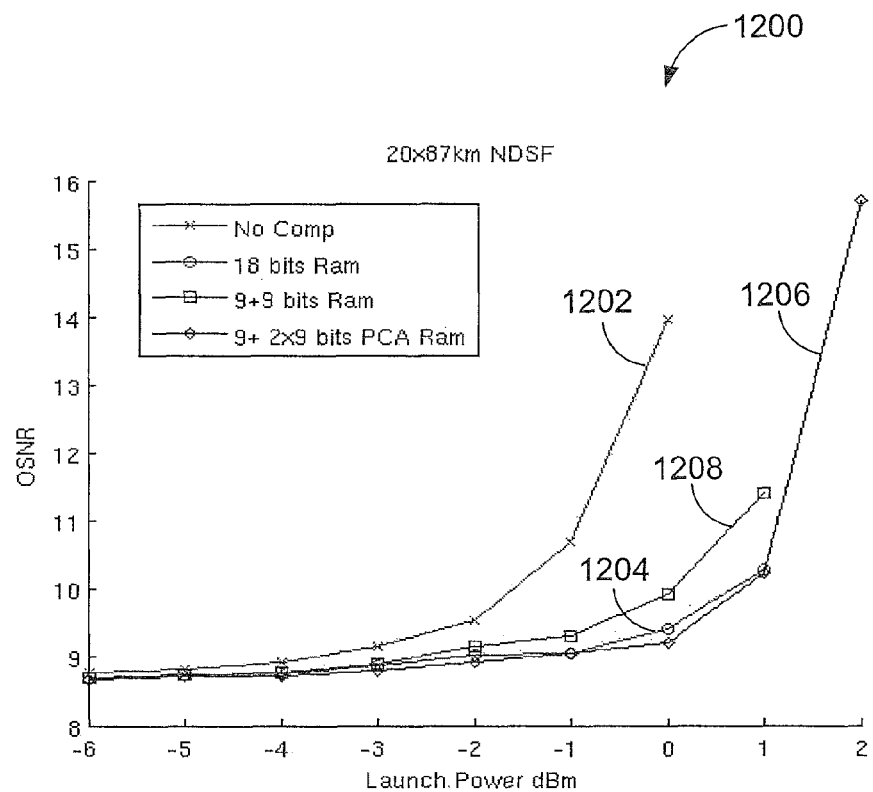
FIG. 12 shows a graph illustrating the theoretical simulated relative performances of the FIR filter implementations of FIGS. 10, 11, and 12, as well as the case where no compensation is used.

Referring now to FIG. 12, a graph 1200 is shown illustrating theoretical simulated relative performances of FIR filter implementations 900, 1000, and 1100, as well as the case where no compensation is used, in a 20 span fibre system, where each fibre is 87 km in length. The vertical axis represents the optical signal to noise ratio (OSNR) and the horizontal axis represents the launch power measured in dBm. Shown in the graph 1200 is the theoretical simulated result where no compensation is used, indicated by reference 1202, where 18 bit RAM is used, indicated by reference 1204 and corresponding to the FIR filter implementation 900, where three 0.5 KB RAMS are used, indicated by reference 1206 and corresponding to FIR filter implementation 1000, and where only two 0.5 KB RAMS are used, indicated by reference 1208 and corresponding to the FIR filter implementation 1100. As described above, Principal Component Analysis is used in the FIR filter implementations 1000 and 1100 to approximate the 512 512 element row vectors used in the FIR filter implementation 900. As shown in the graph by reference 1208, while the FIR filter implementation 1100 exhibits the worst performance of the FIR filter implementations 900, 1000, and 1100, the FIR filter implementation 1100 still represents respectable performance compared to the FIR filter implementations 900 and 1000 and is a substantial improvement over the situation where no compensation is used. Additionally, the implementation 1100 is a practical and useful solution that may be applied to many existing optical modulators being used in optical modems currently in use, for long-haul fiber applications.

While the exemplary embodiments are described above with reference to Finite Impulse Response (FIR) filters implemented as RAM look-up tables, it will be understood by those skilled in the art that the subject matter of the description may be practised using any known, or later developed, digital filter type such as, for example, Finite Impulse Response (FIR) filters, Infinite Impulse Response (IIR) filters, and Fast Fourier Transform (FFT) filters. Further, while self phase modulation (SPM) compensation is often used in the description as an example of the type of compensation to be implemented by the compensation function, the subject matter of the description is equally applicable to and is intended to include compensation for any type of intrachannel non-linearity.

While the present disclosure is primarily described as a hardware system, one skilled in the relevant arts will understand that the present disclosure is also directed to a method for carrying out the aspects of the disclosed system and including method steps for performing each described aspect of the system implementation, be it by way of a computer programmed by appropriate software to enable the practice of the method, or in any other manner. Moreover, an article of manufacture for use with the system, such as a pre-recorded storage device or other similar computer readable medium including program instructions recorded thereon, or a computer data signal carrying computer readable program instructions may direct an apparatus to facilitate the practice of the method. It is understood that such apparatus, articles of manufacture, and computer data signals also come within the scope of the present disclosure.

The embodiments of the present disclosure described above are intended to be examples only. Those skilled in the relevant arts may effect alterations, modifications and variations to the particular embodiments without departing from the intended scope of the present disclosure. In particular, selected features from one or more of the above-described embodiments may be combined to create alternative embodiments not explicitly described, features suitable for such combinations being readily apparent to persons skilled in the art. The subject matter described herein in the recited claims intends to cover and embrace all suitable changes in technology.

The invention claimed is:

1. A digital filter for processing an input signal to be conveyed through an optical communications system, the input signal comprising a serial sample stream having a sample period of T, the processing for generating a predistorted signal using a compensation function that mitigates impairments of the optical communications system, the predistorted signal comprising a serial sample stream having a sample period of T/2, the digital filter comprising:
   a first branch including a respective first T-spaced filter for processing the input signal using the compensation function to generate a corresponding first output signal comprising nT/2 samples with n odd;
   a second branch comprising a respective second T-spaced filter for processing the input signal with a delay of T relative to the first branch using the compensation function to generate a corresponding second output signal comprising nT/2 samples with n even; and
   a combiner for combining the first and second output signals to generate the predistorted signal having a sample period of T/2.

2. The digital filter as claimed in claim 1, wherein the second branch comprises a delay block connected upstream of the second filter for imposing a delay of T on the input signal.

3. A transmitter for transmitting an input signal through an optical communications system, the transmitter comprising:
   a digital filter for processing the input signal to generate a predistorted signal using a compensation function that mitigates impairments of the optical communications system, the input signal comprising a serial sample stream having a sample period of T, and the predistorted signal comprising a serial sample stream having a sample period of T/2, the digital filter including:
      a first branch comprising a respective first T-spaced filter for processing the input signal using the compensation function to generate a corresponding first output signal comprising nT/2 samples with n odd;
      a second branch comprising a respective second T-spaced filter for processing the input signal with a delay of T relative to the first branch using the compensation function to generate a corresponding second output signal comprising nT/2 samples with n even; and
      a combiner for combining the first and second output signals to generate the predistorted signal having a sample period of T/2.

4. The transmitter as claimed in claim 3, wherein the second branch comprises a delay block connected upstream of the second filter for imposing a delay of T on the input signal.

* * * * *